March 29, 1949.  E. H. TAYLOR  2,465,556
PIPE FITTING
Filed June 28, 1946
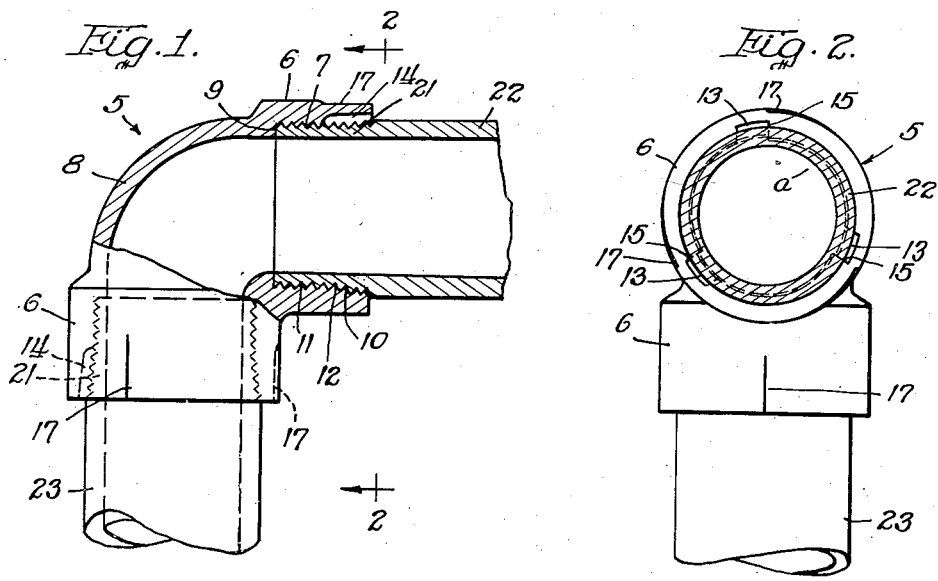
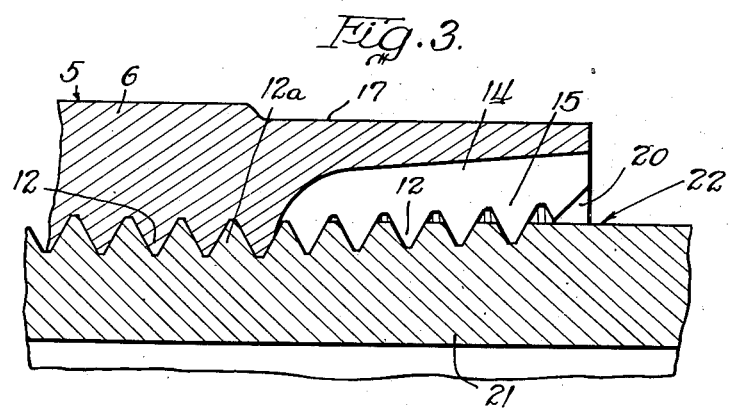
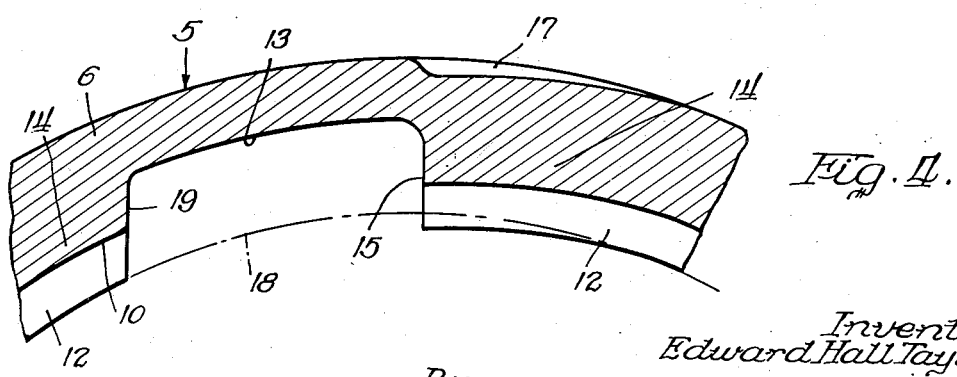
Inventor:
Edward Hall Taylor.
By Brown, Jackson, Boettcher & Dienner,
Attys.

Patented Mar. 29, 1949

2,465,556

UNITED STATES PATENT OFFICE 2,465,556

PIPE FITTING

Edward Hall Taylor, Winnetka, Ill., assignor to Taylor Forge & Pipe Works, Cicero, Ill., a corporation of Illinois Application June 28, 1946, Serial No. 680,203

4 Claims. (Cl. 285—205)

1

This invention relates to pipe fittings, and has to do with pipe fittings intended for securement to pipe ends by threaded engagement therewith.

In erecting lines of piping it is common practice to thread the pipe ends by means of threading dies and to screw the ends of the pipe lengths into interiorly threaded connecting fittings, such as unions, elbows, T's, etc. That necessitates the use of threading dies of various sizes to suit the sizes of pipe used, and die holders, which must be transported by the tradesman or plumber to and from the job. The ordinary pipe fittings, such as those above mentioned, are interiorly threaded from their ends for a predetermined length. In general, the plumber or other tradesman in threading the pipe ends does so for a length substantially greater than the length of the interiorly threaded area of the fitting, to assure that the pipe end will extend fully into the fitting. When such a pipe end is threaded into a fitting, it projects inward thereof beyond the threaded area and the threads of the pipe end project outward beyond the fitting, since it is not possible, from the practical standpoint, for the plumber or other tradesman to thread the pipe ends to proper length and so accurately as to assure that, when it is screwed tightly into the fitting, it will not project inward thereof beyond the threaded area with some of the threads of the pipe end extending outward beyond the end of the fitting. Having the pipe end projecting inward beyond the threaded area of the fitting is objectionable as providing a projection in the fitting and a pocket or recess which provides lodgement for materials flowing through the line of piping, which tend to accumulate in the fitting causing stoppage thereof and corrosion of the fitting and the pipe ends. The projection of the threaded area of the pipe outward beyond the fitting is objectionable since the exposed threads provide lodgement for foreign materials and moisture, resulting in rust or corrosion and weakening of the pipe end. Further, the pipe end is materially reduced in wall thickness at the threaded area thereof providing the basis for starting of fatigue cracks, due to vibration of the pipe. As is well known, most threaded joints fail at the edge of the fitting due to the grooving out of the thread from the wall of the pipe. Also, if imperfect or worn out dies are used in threading the pipe ends, the threads of the pipe end will not match properly the threads of the fitting so that an imperfect and leaky joint between the two often results. In the case of pipe ends that are threaded at the mill from which the threaded pipe is shipped, difficulty often

2 is experienced due to injury in shipment to the pipe threads. In cases where the pipe is cut to lengths on the job, as is frequently necessary, the use of threading dies of various sizes is required, as above noted.

My invention is directed to the provision of a pipe fitting which avoids the objections to the present practice, above referred to. To that end, I provide a fitting so constructed that it will thread an initially unthreaded pipe end inserted into the end of the fitting and rotated therein in proper direction to be operated on by the threading means of the fitting. Preferably, the end portion of the fitting is provided with a socket of increased interior diameter relative to the body of the fitting, this socket having an inwardly tapering outer area from the inner end of which extends an inner area, both of such areas being provided with a helical thread interrupted, at the outer area, by a groove extending lengthwise of the end portion of the fitting and providing a cutting edge. The inner area of the socket is of substantially uniform diameter, approximately the same as the inner end of the outer area, for receiving the pipe end threaded by the latter area. The socket is provided, at its inner end, with a shoulder or seat of a radial extent approximately the same as the wall thickness of the threaded inner end of the pipe, which seats against the shoulder when the pipe has been fully threaded into the fitting, so as to assure a tight closure therebetween, and avoid any objectionable projections or recesses in the interior of the fitting, at the inner end of the pipe, avoiding collection of sediment in the fitting as well as objectionable resistance to flow of fluid through the line of piping. As the pipe is rotated in the end of the fitting, it is threaded thereby and is also screwed into the fitting, the threaded pipe end passing from the outer area of the socket into the inner area thereof, into which it is screwed until the end of the pipe seats tightly against the shoulder at the inner end of the socket. Preferably, the inner area of the socket is of slightly less diameter than the threaded end of the pipe so as to compress the latter slightly radially and assure a tight closure therewith, as will be explained more fully later. When the pipe end has been screwed into the fitting in the manner described, the threads thereof match perfectly the threads of the fitting, since the pipe end is threaded by the fitting, and there are no threads in the pipe end exposed beyond the end of the fitting, whereby tendency of the pipe to break at the edge of the fitting, due to the presence of exposed threads on the pipe, is eliminated. Further objects and advantages of my invention will appear from the detail description.

In the drawings:

Figure 1 is a lengthwise sectional view through a pipe end and a fitting applied thereto embodying my invention, this view also showing the fitting partially in elevation and a second pipe end in elevation;

Figure 2 is a sectional view taken substantially on line 2—2 of Figure 1;

Figure 3 is a fragmentary lengthwise sectional view, on an enlarged scale, of the fitting and the pipe end secured therein; and Figure 4 is a transverse sectional view of the fitting, on an enlarged scale.

I have illustrated my invention, by way of example, as embodied in an elbow, though it is to be understood that it is applicable to various other fittings, such as unions, T's, pipe bends generally and various other articles analogous to pipe fittings.

I have shown an elbow 5, which may be formed of any suitable metal, preferably steel for use with iron or steel pipes, this elbow having at each end an enlargement 6 provided interiorly with a socket 7 of increased interior diameter relative to body 8 of elbow 5, providing an annular shoulder 9 at the inner end of socket 7. The socket 7 comprises an outer area 10 opening at the end of the fitting and tapering inward, and an inner area 11 of substantially uniform diameter approximately the same as the inner end of area 10. Both areas 10 and 11 of socket 7 are provided with a helical thread 12 interrupted, at area 10 of socket 7, by one or more grooves 13 extending lengthwise thereof. In Figure 2 I have shown three grooves 13 interrupting or intersecting thread 12 and, in effect, separating the area 10 of socket 7 into three segments 14 each having a leading cutting edge 15 preferably disposed substantially radial to socket 7.

Since the thread 12 extends helically about socket 7, the cut end of each convolution thereof at the leading or cutting edge 15 of the respective grooves 13 will be slightly near the axis of socket 7 than the following end of the same convolution of the thread, as will be understood. Accordingly, if a pipe end is rotated in proper direction—clockwise as viewed in Figure 2—in socket 7 of fitting 5, the cutting edges 15 of the segments 14 will cut threads in the pipe ends. While the inward projection of the convolutions of thread 12, at the cutting edges thereof, due to the taper of area 10 of socket 7, suffices in certain cases to cut the desired thread in the pipe end, I preferably offset the cutting edge 15 of the respective segments 14 inward a substantially greater extent than provided for by the taper of area 10 of socket 11. Referring to Figure 4, after the socket 7 has been appropriately threaded and provided with the grooves 13, as above explained, the end portion 6 of the fitting is placed in suitable dies and the wall of the fitting, at the area thereof adjacent the cutting edges 15 of the segments 14, is pressed inwardly at 17. That disposes the thread at the cutting edge 15 inward a substantial distance beyond the outside diameter of the pipe end to be threaded, indicated by the dot and dash lines 18, to be referred to more fully presently, and also radially inward a substantially greater distance than the threaded area at the following edge 19 of the respective segments 14. After the end portion 6 of the fitting 5 has been appropriately threaded and formed, as above, the thread 12, particularly the segments 14, including the cutting edges 15, are surface hardened, in a known manner, to resist wear and facilitate threading of the pipe end.

As is shown more clearly in Figure 3, the thread 12 is chamfered off at 20 so that the interior diameter of the first convolution of this thread is slightly greater than the outside diameter of an initially unthreaded pipe end 21 which is to be threaded by and screwed into the end of fitting 5. In applying a pipe 22 to fitting 5, end 21 of the pipe, initially unthreaded, is inserted into the outer end of socket 7 and the pipe 22 is then rotated in clockwise direction, as indicated by the arrow a in Figure 2, by means of a wrench or other suitable tool applied thereto. As the pipe 22 is rotated the end 21 thereof is threaded by means of the cutting edges 15 of the threaded segments 14 of the outer area 10 of socket 7, as will be understood, and is screwed into socket 7. When the threaded area of the pipe end reaches the inner end of area 10 of socket 7, it has been completely threaded and, in the continued rotation of pipe 22, is screwed into the inner area 11 of socket 7, until the inner end of pipe 22 seats tightly against the shoulder or seat 9. That provides a smooth connection between the interior of fitting 5 and the interior of the end of pipe 22, avoiding all projections or pockets within the fitting such as would tend to catch sediment and interfere objectionably with free flow of fluid through the line of piping. Since the pipe end 21 is threaded by end portion 6 of fitting 5, when the pipe has been screwed fully into the end of the fitting the end of the pipe does not have therein any threads extending outward beyond the fitting. That avoids the risk of failure of the pipe at the end of the fitting, such as occurs when lines of piping are erected in the usual manner, with the threaded area of the pipe extending outward beyond the fitting, previously referred to.

Preferably the inner area 11 of socket 7 is of slightly less diameter, at the vertex of thread 12, than the outside diameter of the pipe end 21 at the root of the thread 12a cut thereon by segments 14 in the manner above described. This difference in diameter is slight but sufficient to assure that the portion of the pipe end screwed into area 11 of socket 7 is placed under radial compression, assuring a tight closure about the inner portion of the pipe end and also serving, to a certain extent, to lock the pipe end in the fitting. As previously stated, area 11 of socket 7 preferably is of uniform diameter, though slight variation in that respect is permissible and area 7 may be tapered slightly to assure tight engagement therein of the pipe end, but the taper should be such as not to cause binding of the pipe end in area 7 such as would prevent the inner end of the pipe from seating tightly against shoulder 9.

It will be understood that changes in details may be made without departing from the field and scope of my invention, and I intend to include all such variations, as fall within the scope of the appended claims, in this application in which the preferred form only of my invention has been disclosed.

I claim:

1. As a new article of manufacture, a pipe fitting for securement to an initially unthreaded pipe end by threaded engagement therewith, said fitting having an end portion tapering inward interiorly and provided with an interior helical thread interrupted by a groove extending lengthwise of said end portion providing a cutting edge, said cutting edge being offset inwardly of said fitting end portion and the latter being effective for threading a pipe end inserted therein and rotated toward said cutting edge whereby the pipe end is screwed into the fitting as it is threaded, the inward offset of said cutting edge providing relief and reduced friction in the thread cutting operation.

2. As a new article of manufacture, a pipe fitting for securement to an initially unthreaded pipe end by threaded engagement therewith, said fitting having an end portion of increased interior diameter relative to the body thereof providing a socket opening through the end of the fitting and a shoulder at the inner end of said socket extending radially inward therebeyond, the latter having an outer inwardly tapering area and an inner area of substantially uniform diameter approximately the same as and extending inward from the inner end of said outer area, said inner area being disposed in angular relation to said outer area and both of said areas being screw threaded and the thread of said outer area being interrupted by a groove extending lengthwise of said socket providing a cutting edge, whereby an unthreaded pipe end inserted into said socket and rotated toward said cutting edge will be threaded and screwed into said outer area of said socket as it is threaded and the inner portion of the threaded pipe end will be screwed into said inner area.

3. As a new article of manufacture, a pipe fitting for securement to an initially unthreaded pipe end by threaded engagement therewith, said fitting having an end portion provided interiorly with an outer inwardly tapering area and an inner area of substantially uniform diameter approximately the same as and extending inward from the inner end of said outer area, said inner area being disposed in angular relation to said outer area and both of said areas being screw threaded and the thread of said outer area being interrupted by a groove extending lengthwise of said end portion providing a cutting edge, said cutting edge being offset inwardly of said fitting end portion and said outer area being effective for threading a pipe end rotated therein whereby an unthreaded pipe end inserted into said fitting end portion and rotated toward said cutting edge will be threaded and screwed into said outer area of said fitting end portion as it is threaded and the inner portion of the threaded pipe end will be screwed into said inner area.

4. As a new article of manufacture, a pipe fitting for securement to an initially unthreaded pipe end by threaded engagement therewith, said fitting having an end portion provided interiorly with an outer inwardly tapering area and an inner area of substantially uniform diameter extending inward from the inner end of said outer area at an angle thereto, both of said areas being screw threaded and the thread of said outer area being interrupted by a groove extending lengthwise of said end portion providing a cutting edge, the effective diameter of said inner area being but slightly less than that of the inner end of said outer area, the latter being effective for threading a pipe end rotated therein whereby an unthreaded pipe end inserted in said end portion and rotated toward said cutting edge will be threaded and screwed into said outer area of said fitting end portion as it is threaded and the inner portion of the threaded pipe end will be screwed into said inner area under radial compression providing a tight closure therebetween.

EDWARD HALL TAYLOR.

REFERENCES CITED

The following references are of record in the file of this patent:

UNITED STATES PATENTS

| Number | Name | Date |
| --- | --- | --- |
| 2,152,962 | Ice | Apr. 4, 1939 |